(12) United States Patent
Priller (10) Patent No.: US 11,310,667 B2
(45) Date of Patent: Apr. 19, 2022

(54) COMMUNICATION BY A NETWORK NODE IN A DATA NETWORK

(71) Applicant: AVL LIST GMBH, Graz (AT)

(72) Inventor: Peter Priller, Gratwein-Strassengel (AT)

(73) Assignee: AVL List GmbH, Graz (AT)

( * ) Notice: Subject to any disclaimer, the term of this patent is extended or adjusted under 35 U.S.C. 154(b) by 22 days.

(21) Appl. No.: 16/475,320

(22) PCT Filed: Dec. 29, 2017

(86) PCT No.: PCT/EP2017/084798
§ 371 (c)(1),
(2) Date: Jul. 1, 2019

(87) PCT Pub. No.: WO2018/122367
PCT Pub. Date: Jul. 5, 2018

(65) Prior Publication Data
US 2020/0389787 A1 Dec. 10, 2020

(30) Foreign Application Priority Data

Dec. 30, 2016 (AT) .............................. A 51196/2016

(51) Int. Cl.
*H04W 4/00* (2018.01)
*H04W 12/50* (2021.01)
(Continued)

(52) U.S. Cl.
CPC ......... *H04W 12/50* (2021.01); *H04W 12/033* (2021.01); *H04W 12/041* (2021.01);
(Continued)

(58) Field of Classification Search
CPC . H04W 12/50; H04W 12/033; H04W 12/041; H04W 12/71; H04W 12/0431;
(Continued)

(56) References Cited

U.S. PATENT DOCUMENTS 7,309,907 B2 12/2007 De Jongh et al.
8,009,557 B2 8/2011 Curran-Gray et al.
(Continued)

FOREIGN PATENT DOCUMENTS

DE 102014102007 A1 8/2015
EP 2565444 A1 3/2013
(Continued)

*Primary Examiner* — Phuongchau Ba Nguyen
(74) *Attorney, Agent, or Firm* — Dykema Gossett PLLC (57) ABSTRACT

A method for establishing a communication connection between a network node and a communication partner in a data network is provided The network node receives at least one message from the communication partner via a wireless interface and verification data are attached to the message. The verification data include a transmitter measured data image, representative of measured data acquired by the communication partner in a preceding recording period. The network node verifies the communication partner by a comparison, based on a correlation known to the network node) and/or communicated by the communication partner to the network node of the transmitter measured data image contained in the received verification data with a receiver measured data image, which has been created separately from the transmitter measured data image and which is stored in a data memory of the network node.

13 Claims, 3 Drawing Sheets

(51) Int. Cl.
*H04W 76/14* (2018.01)
*H04W 12/06* (2021.01)
*H04W 12/10* (2021.01)
*H04W 12/033* (2021.01)
*H04W 12/041* (2021.01)
*H04W 12/71* (2021.01)
*H04W 12/0431* (2021.01)

(52) U.S. Cl.
CPC ....... *H04W 12/0431* (2021.01); *H04W 12/06* (2013.01); *H04W 12/10* (2013.01); *H04W 12/71* (2021.01); *H04W 76/14* (2018.02)

(58) Field of Classification Search
CPC ..... H04W 76/14; H04W 12/06; H04W 12/10; H04W 84/12; H04W 84/18; H04W 80/04; H04W 8/26; H04W 88/06; H04L 43/08; H04L 41/28; H04L 43/00; H04L 43/12; H04L 2463/082; G06F 21/74; G06F 21/83
See application file for complete search history.

(56) References Cited

U.S. PATENT DOCUMENTS

| | | |
|---|---|---|
| 9,211,879 B2 | 12/2015 | Leitel et al. |
| 2006/0016877 A1* | 1/2006 | Bonalle ............... G07C 9/27 235/380 |
| 2006/0209760 A1* | 9/2006 | Saito ............... H04L 61/2084 370/331 |
| 2010/0066501 A1 | 3/2010 | Ulrich et al. |
| 2014/0309868 A1* | 10/2014 | Ricci ............... H04W 12/084 701/36 |
| 2015/0104012 A1* | 4/2015 | Holman ............... H04W 12/02 380/243 |
| 2016/0239657 A1* | 8/2016 | Loughlin-McHugh ............... H04L 63/0807 |
| 2018/0115540 A1* | 4/2018 | Moiyallah, Jr. ......... H04L 63/08 |
| 2018/0165781 A1* | 6/2018 | Rodriguez ............. H04L 63/08 |
| 2018/0324177 A1* | 11/2018 | Wang .................... H04W 12/33 |
| 2018/0349647 A1 | 12/2018 | Morgner et al. |
| 2020/0311709 A1* | 10/2020 | White, III ............ G06Q 20/102 |
| 2020/0389787 A1* | 12/2020 | Priller ................ H04W 12/041 |

FOREIGN PATENT DOCUMENTS

| | | |
|---|---|---|
| JP | 2014138404 A | 7/2014 |
| WO | 2005015427 A1 | 2/2005 |
| WO | 2005071922 A1 | 8/2005 |
| WO | 2006014205 A2 | 2/2006 |
| WO | 2009071602 A2 | 6/2009 |

* cited by examiner

COMMUNICATION BY A NETWORK NODE IN A DATA NETWORK

CROSS-REFERENCE TO RELATED APPLICATIONS

This application is a national stage filing based upon International PCT Application No. PCT/EP2017/084798, filed 29 Dec. 2017, which claims the benefit of priority to Austria application No. A51196/2016, filed 30 Dec. 2016, the disclosures of which are incorporated herein by reference.

BACKGROUND

The invention relates to a method for establishing a communication connection between a network node and a communication partner in a data network, wherein the network node receives at least one message via a wireless interface from the communication partner, and wherein verification data are attached to the message.

A variety of different devices have been recently equipped with the option of wireless connectivity, for example, via radio links. To relieve users of the often cumbersome task of setting up a data network, such devices may often by themselves automatically establish communication links to other compatible devices so that several of these devices form an ad hoc network as soon as they become active and are in mutual receiving range. Examples of such networks from the user domain are, for example, the automatic coupling of a smartphone to the audio system of a vehicle, for example, via the known Bluetooth standard, for example, to utilize the audio system as a vehicle hands-free system. In the course of the development known as "Internet-of-things", this capability is extended to other objects for everyday use, so that household items, smartphones, hi-fi devices, home installations, sensors, control devices, such as for indoor climate, and similar devices are able to communicate with each other without the user necessarily having to be aware of this.

Although this can bring about enormous benefits for the user, the possibilities of abuse, for example, in the form of hacker attacks, increase enormously with the expanded networking. Internet of Things (IoT) in combination with wireless communication risks allowing attackers to communicate with technical systems by using a mirrored identity, and perhaps thereby gaining unauthorized access to data, or activating functions, or carrying out unauthorized changes (security exploit). Thus, before automatically establishing a data communication, it must be ensured by each device that the communication partners are trustworthy.

This determination or test of trustworthiness is generally referred to as "verification" in the context of the present disclosure. The process of verifying may include, for example, checking whether the communication partner is part of the same system. In the above example, this system could encompass, for example, all communication partners in a vehicle, it being necessary to exclude devices outside the vehicle or in adjacent vehicles from being integrated into the ad hoc network. Currently, verification is usually done "manually" by, for example, prompting the user of a smartphone to enter a code displayed on a display of the vehicle before a connection between the vehicle system and the smartphone is established.

Safety concerns are also the reason why the use of autonomously communicating devices may be problematic in the industrial sector and in the field of systems with increased safety requirements. Here, too, the authorization for data communication between individual devices must therefore be defined by the user. In the case of more stringent security requirements, the connection may also be established in an encrypted manner, wherein the exchange of the encryption keys, in particular, is susceptible to attacks.

With measuring devices in an industrial application, for example, measuring devices in a test bench, being able to connect to one another and to exchange data via an ad-hoc established wireless communication, possibly also independent of the actual transmission of measured data to an automation system, it is possible to implement additional features and to create an added benefit for the customer. In addition to the safety considerations set out above, it must be ensured that the devices are actually used on the same test bench, since wireless communication is also possible across spatial boundaries, and thus may also reach non-associated devices (such as the devices installed in another test bench in the adjacent room). It must also be ensured that the communication partner can be trusted, i.e., that it really is an active measuring device and that it is not simulated by an unauthorized device located and/or hidden in the same room or in the adjacent room. These safety precautions may be particularly relevant if test benches are rented to different companies, such that competitors in neighboring rooms may carry out tests simultaneously. This problem arises even in the case of wireless sensor networks, in which the measured data are transmitted wirelessly to an automation system. The affiliation of a device to a specific test bench or test object must therefore currently be configured manually, for example, by test bench technicians. This may be done, for example, by entering a serial number or by disclosing other features, or may include other actions that are not fully automatable. Through this manual process, it is assumed that during the course of this process, the person inputting has also checked the authenticity of the device; here too, there are security risks. The process is currently not fully automatable and errors in the information regarding authenticity are subsequently not verifiable.

Another specific application in which the above-mentioned security problems are relevant, is the previously mentioned networking of (wireless) cooperating systems (control units, sensors, etc.) distributed in a vehicle, whether in connection with mobile measuring systems for test purposes or for the production-ready vehicle.

SUMMARY OF THE INVENTION

It is an object of the present invention to establish the connection of ad-hoc networks in a more secure and at the same time simpler manner, wherein the disadvantages of the prior art described above, in particular, are to be avoided.

According to the invention, these and other objects are achieved by a method of the type mentioned above, in which the verification data include a transmitter measured data image which is representative of measured data acquired by the communication partner in a previous recording period, the network node verifying the communication partner by a comparison, based on a correlation known and/or communicated to the network node by the communication partner, of a transmitter measured data image contained in the received verification data with a receiver measured data image, which has been created separately from the transmitter measured data image and which is stored in a data memory of the network node. This allows an automatic detection and verification of the communication partner by the network node with no additional manual interaction. The participating devices in this case have a common, synchronous piece of time information, this may be ensured, for example, via the reception of a radio-controlled clock signal or via locally wirelessly sent timestamps. According to the invention, it is possible to distinguish whether a communication partner only pretends to belong to the same measurement environment or whether it is actually present.

The method according to the invention may be used in a vehicle, for example. This method could, for example, detect whether or not a users smartphone is in the vehicle and has traveled along. A trusted connection for example, via Bluetooth, is established only in the case of "traveled along". The application in a larger context, for example, for the identification and secure authentication of vehicles communicating via V2V (C2C) and the assignment to the surroundings of the individual vehicle may also utilize the method according to the invention.

The receiver measured data image may be created, for example, by the network node as a representation of self-acquired measured data, which requires that the network node has a measured data acquisition, for example, if the network node is a measuring device. However, the receiver measured data image may also be a measured data image created by the network node, which is generated based on measured data that has been obtained from a third party already classified as trustworthy. This may be the case, for example, if the network node is an automation system that receives and stores the measured data of multiple measuring devices.

According to the invention, the network node and the communication partner may be a measuring point or an automation system of a measurement environment independent of one another. This makes it possible, for example, for all devices of a single manufacturer that are involved in a test bench measurement, to communicate with each other in an ad hoc network, and to provide additional functionalities as a function of the different device combinations. Verification based on the measurement process ensures that only the devices that are active on the same test bench are actually linked. Communication may also be established between the corresponding devices if other measuring devices (for example, from third-party manufacturers) are integrated into the test system, or if an automation system is used that does not support this structure of the ad hoc network.

According to the invention, the network node may advantageously create an encryption key for encrypted communication with the communication partner on the basis of the transmitter measured data image. In this case, the network node may use the data of the transmitter measured data image conveyed by the communication partner.

On the other hand, transmission of encryption information may be avoided if the network node uses stored measured data to create the encryption key. Thus, the network node may advantageously create an encryption key for encrypted communication with the communication partner on the basis of the receiver measured data image. For example, the network node may ascertain the time period corresponding to the transmitter measured data image in the receiver measured data image and create the encryption key on the basis of a delayed time period of the receiver measured data image. The communication partner creates the encryption key on the basis of the same delayed time period of the transmitter measured data image. Thus, the encrypted data transmission works only if the transmitter and the receiver measured data image correspond to one another, i.e., have been generated on the basis of measurements on the same test bench without the database for the encryption key having to be transmitted via the data network in the process.

The term "encryption key" is used in the context of the present invention generally for cryptographic keys, regardless of whether this is used to encrypt or decrypt a message and regardless of whether it is a symmetrical or an asymmetrical encryption method.

Differences between the receiver measured data image and the transmitter measured data image may be calculated out on the basis of the known correlation between network node and communication partner. The correlation may be, for example, a time delay or a positive or negative gain, which may be easily deducted. However, more complex correlations may also be taken into consideration if the properties of the network node and the communication partner are known. Parameters of a system in which the network node and the communication partner are used, may optionally also be used to ascertain the correlation. In the case of a test bench, for example, power data and/or material data of the test object and/or of the dynamometer may be taken into consideration. The correlation may, for example, be a product of the structure of the system. For example, in a transmission, the input speed and output speed are correlated via the transmission ratio.

In one advantageous embodiment, the network node may create at least one virtual network node based on the correlation after the communication partner is verified. If, for example, a third measured value can be calculated from a first measured value and a second measured value, the network node (if it measures the first measured value) may utilize the communication with the communication partner (if, for example, it measures the second measured value) to obtain the measured data of the communication partner received in real time, calculate the third measured value therefrom, and provide the third measured value to the automation system. The automation system may process the data of the third measured value in a separate channel as if the virtual network node were a genuine measuring device. The network node, if it is an automation system, may also create the third measured value on the basis of one or multiple measured values of the communication partner or of multiple communication partners.

In one preferred embodiment, the data network may be an ad hoc network. An ad hoc network is a data network, which is automatically established by the participating devices (or network nodes and communication partners) without being configured by a user, as soon as these devices are within the range of their wireless interfaces. In contrast, it is also possible to establish a data network in a conventional manner via a definition specified by the user. The method according to the invention may then provide an additional level of security.

In another aspect, the invention relates to a network node having at least one transducer, at least one wireless interface, at least one processor unit and at least one data memory, wherein a program logic executable by the network node is implemented in the network node, and wherein the network node, when executing the program logic, carries out a previously described method according to the invention. The network node in this case may be any device that is suitable for establishing an ad hoc network. The transducer may be a sensor or a unit generating other measured data. For mobile applications, the transducer may, for example, be a sensor for ascertaining position coordinates, in particular, for ascertaining geo-coordinates such as, for example, a GPS chip.

The network node may advantageously be a measuring device for a measurement environment. A measurement environment in the context of the present invention refers to an area defined for a testing task and/or analytical task and/or control task, for example, a mobile or stationary laboratory, a mobile or stationary test bench, an aircraft, land vehicle and/or watercraft or, in general, a property or a terrain area.

In another advantageous embodiment, the network node may be a measuring device or an automation system for an engine test bench.

BRIEF DESCRIPTION OF THE DRAWINGS

The present invention is described in greater detail below with reference to the FIGS. 1 through 4, which show exemplary, schematic and non-limiting advantageous embodiments of the invention. In the drawings.

DETAILED DESCRIPTION

Figure 1:
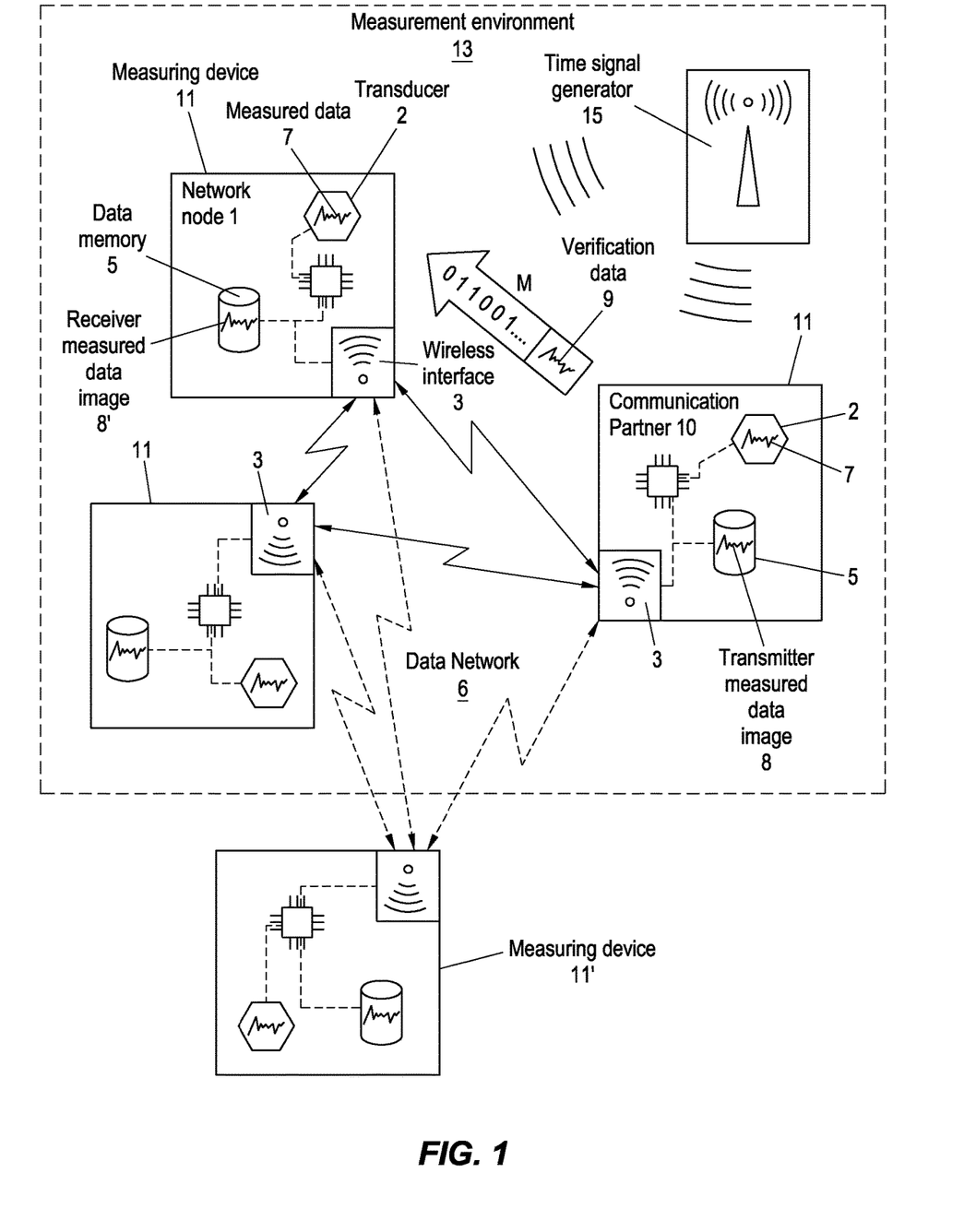
FIG. 1 shows a schematic representation of an ad hoc network, which utilizes the method according to the invention.

FIG. 1 schematically shows a measurement environment 13, in which multiple measuring devices 11 are situated, each of which are able to exchange data with each other via a wireless interface 3. Each measuring device 11 has a transducer 2, a data memory 5 and a processor unit 4. A time signal generator 15 provides all measuring devices 11 with matching time information, so that the measuring devices 11 are able to provide the data stored in the data memory 5 with corresponding pieces of time information as needed. The time signal transmitter 15 may send time stamps locally wirelessly. Alternatively, a radio-controlled clock signal may be utilized to synchronize the measuring devices 11.

For the sake of clarity, particular reference will be made below to the implementation of the methods and devices of the invention in a test bench environment, however, those skilled in the art will be able to readily apply the teachings disclosed herein to other specific applications. Specific applications include, in particular, systems in which multiple devices are able to establish and use ad hoc networks.

In FIG. 1, three measuring devices 11 are situated in the area of the measurement environment 13, each of which generates measured data 7 via the transducer 2 and stores the data in the data memory 5 and/or transmits the data via an arbitrary data connection to an automation system. The measured data may be transmitted via the wireless interface 3 or via another data connection (not shown in FIG. 1).

In addition, the measuring devices 11 are able to communicate with each other and thus able to establish an ad hoc network. This ad hoc network (which is shown schematically in FIG. 1 as a data network 6) may comprise, for example, all devices of a manufacturer in the measurement environment 13 whose program logic supports the methods according to the present invention. Older measuring devices 11 that do not support an ad hoc network, or components of other manufacturers not intended for joining the ad hoc network, may still be incorporated in the measurement environment 13, but are not considered when establishing the ad hoc network.

The establishment of a connection between two measuring devices 11 is described below for a network node 1, which establishes a communication connection with a communication partner 10. Both the network node 1 and the communication partner 10 are each a measuring device 11 of the measurement environment 13 in the case illustrated here.

The terms "network nodes" and "communication partners" in the context of the present description merely serve to clarify the description and the identifiability of the devices and imply no functional differences. Each device in the ad hoc network may either be considered to be network node 1 or communication partner 10, depending on one's perspective. The device that seeks to identify itself as trustworthy is referred to as a communication partner 10 in the context of the present description, and the device that verifies the communication partner 10 is referred to as network node 1.

All measuring devices 11 continuously store a measured data image of the measured data 7 recorded by their transducer 2 in their data memory, wherein the measured data image of the communication partner is referred to below as transmitter measured data image 8 and the measured data image of network node 1 as receiver measured data image 8'. The measured data images thus represent a profile of the measured data and may be stored in the data memory 5 over a definable period of time (for example, the last hour).

The measuring devices 11 are able to continuously detect the other devices within radio range via known protocols and to decide on the basis of known algorithms whether a connection with located devices should be established.

In the case shown, the communication partner 10 seeks to establish a connection with the network node 1. To identify itself to the network node 1 as a trustworthy device, the communication partner 10 sends a message M via the wireless interface 3, which is received by the network node 1. The message M contains verification data 9, which represent a subsection of the transmitter measured data image 8, wherein the range is either defined by the current time (for example, the last 2 seconds of the measurement) and/or may be identified with a time specification. The message M may further contain the usual pieces of packet data information as well as, for example, pieces of information about the communication partner 10. The time span may also be ascertained on the basis of certain characteristic "events" in the course of the measurement, for example a load change, which must have influenced the profile of the measured data 7 of both measuring devices 11 in a comparable manner.

From the pieces of information regarding the communication partner 10, the network node 1 ascertains a correlation between the received transmitter measured data image 8 and the receiver measured data image 8' stored in its data memory. This correlation is applied to the transmitter measured data image 8 in order to ascertain the corresponding section in the receiver measured data image 8' (or vice versa) and to compare the two measured data images. The two measured data images, by matching, prove that the communication partner 10 is in the same measurement environment 13 as the network node 1, and may therefore be considered trustworthy. Following this positive validation, a connection with the communication partner 10 may thus be established for the further data exchange. In the same way, the network node 1 may, of course, also be verified as a trustworthy device with respect to the communication partner 10.

It would be conceivable for an attacker to intercept such a data exchange and re-use the transmitted measured data image to simulate a false identity (replay attack). This could be prevented, for example, by allowing the measured data image of a specific time period to be used precisely only once, i.e., by not accepting it a second time after a single transmission by the nodes in the network. Another measure would be if, in a handshake procedure, the network node first requires a certain, past period of time for which the data must be provided by the communication partner and re-establishes (for example, randomly) this time period for each new exchange.

Optionally, the connection may be encrypted by known methods to prevent the communication from being intercepted. An encryption key may optionally be provided based on the measured data image 8. Since it has already been determined from the section of the measured data image transmitted in the verification data 9 that the measured data images correlate, it is possible to create encryption keys based on a different (not transmitted) time range of the measured data image, wherein the network node 1 creates the encryption key on the basis of the receiver measured data image 8' and the communication partner 10 creates the encryption key on the basis of the transmitter measured data image 8. This possibility of generating an identical code on both sides, which however, never had to be transmitted between the two communication partners, enables the implementation of very secure encryption mechanisms.

When establishing a secure connection, it must also be taken into consideration that this initially required exchange of measured data cannot already lead to an attack, for example, by un-trusted action still being taken here, i.e., only the smallest possible subset of functions is available, similar to a firewall in the "maximum protection" setting. The comparison of locally available data must also provide a sufficient basis for a trusted/untrusted decision, for example, by using a sufficiently variable and not otherwise predictable measuring signal for a sufficiently long period of time. It is also important to ensure that the communication partner is not already compromised. This could be the case, for example, if a normally legitimate local system has already been hacked and thus has knowledge of this information available only locally, as well as already being controlled by an attacker. Very high safety standards may be achieved if these conditions are met.

Another measuring device 11' is shown in FIG. 1, which is outside the measurement environment, but still within the radio range of the data network 6. The additional measuring device 11' may, for example, be a device which is situated on another test bench in an adjoining room, but it may also be a hidden device via which a hacking attack on the data network 6 is being attempted. In both cases, however, the network node 1 will not verify this other measuring device 11' when it attempts to establish a connection, since its measuring data profile corresponds to a different measuring environment and, therefore, the measured data images 8 also do not match.

Figure 2:
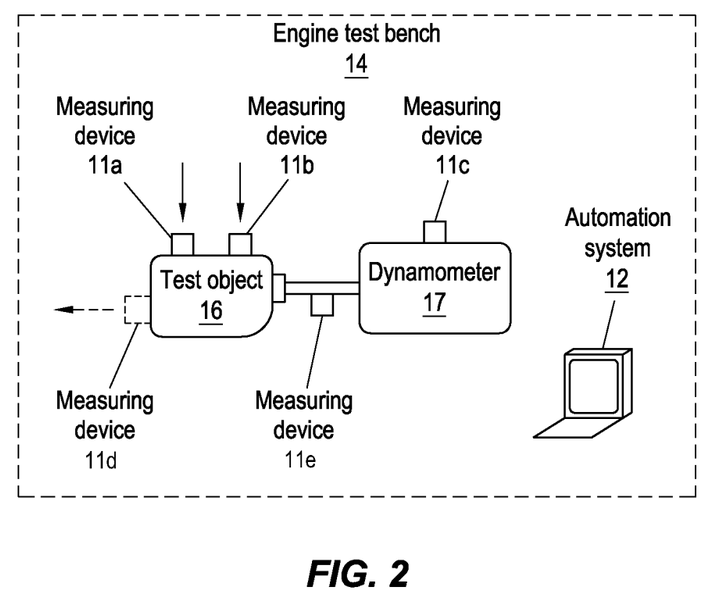
FIG. 2 shows a schematic representation of an engine test bench, in which the method according to the invention is implemented.

FIG. 2 shows the implementation of the method according to the invention on an engine test bench 14. A test object 16, for example, an internal combustion engine or electric motor, optionally in conjunction with a drive train, which is connected to a dynamometer 17, is situated on the engine test bench 14. In this test arrangement, a plurality of measuring devices 11a-11d are situated in a conventional manner, the measurements of which are evaluated by an automation system 12. The automation system 12 also regulates the specifications for the test object 16 and the dynamometer 17.

The measuring devices 11a-11d cyclically acquire data from their transducers (or sensors) over a specific period of time (for example, a few hours) and store these data as a time series (with synchronized time information, see above) internally in their data memory 5. To save memory space, an effective data reduction may take place. For example, certain changes (flanks in the measured value, "events") may be detected, and only a brief description of this event may be stored.

Since the various measuring devices 11a-11d observe the same test arrangement on a test bench, they must have recorded chronologically correlating events or their effect on the respective measured variable. It may be generally assumed that systems in certain local proximity to one another detect certain physical processes at comparable times in a comparable manner.

As an example, at engine startup, a dyno measurement detects a change in engine speed and torque, the exhaust gas measurement detects an increase in NOx, the fuel consumption measurement detects a change in the amount of fuel per unit of time, and the temperature measurement on the cylinder detects a (perhaps delayed) rise in temperature. These correlations are either already known based on the properties of the respective measuring sensors or may be ascertained for a test bench.

Each measuring device 11a-11d stores such "events" in the internal memory. After a certain number of such events, it may be assumed with a certain probability that, given a match of characteristic details (point in time, duration, shape . . . ) taking physical conditions (defined delay time, dependency of physical quantities, etc.) into consideration, these were the same events and therefore the same test object has been observed. The longer the observation time, the more "common history" the participating devices collect, and the more certain it is that, if they match, it involves measuring devices on the same test bench.

In terms of an identification, "identification" of one device with respect to another, this common knowledge may be presented as evidence of affiliation, as has been described above.

If this knowledge is not given to the outside in plain language but cryptographically encrypted, the only possible deduction is the presence of this knowledge in the device, without the possibility of this knowledge being readjusted by third parties. Counterfeiting without actual co-measurement is therefore not possible or possible only with difficulty. Thus, in addition to the information "measuring device is on the same test object", it is also possible to detect "measuring device is actually a real measuring device".

On the basis of a combination of the measured data 7 of two or multiple measuring devices 11, it is possible under certain circumstances to calculate a third measured variable in real time. This allows the generation of "virtual measuring devices", such as the virtual measuring device 11e shown in FIG. 2, whose measured data 7 is generated based on the measurements of the two measuring devices 11a and 11b.

As a practical example, the measuring device 11a could, for example, measure the quantity of fuel supplied to the test piece 16 and the measuring device 11b could measure the amount of air supplied. From this, a value for the amount of exhaust gas may be ascertained via known relationships. This value for the amount of exhaust gas may thus be provided as measured data 7 of the virtual measuring device 11e to the automation system 12 when the two measuring devices 11a and 11b communicate with each other in the ad hoc network. Virtual measuring devices may also be created by the automation system 12 if the automation system 12 is also integrated into the ad hoc network. The other measuring devices 11c and 11d may either also be integrated into the ad hoc network, or they may be older devices or devices from other manufacturers, which may then be used completely normally.

Figure 3:
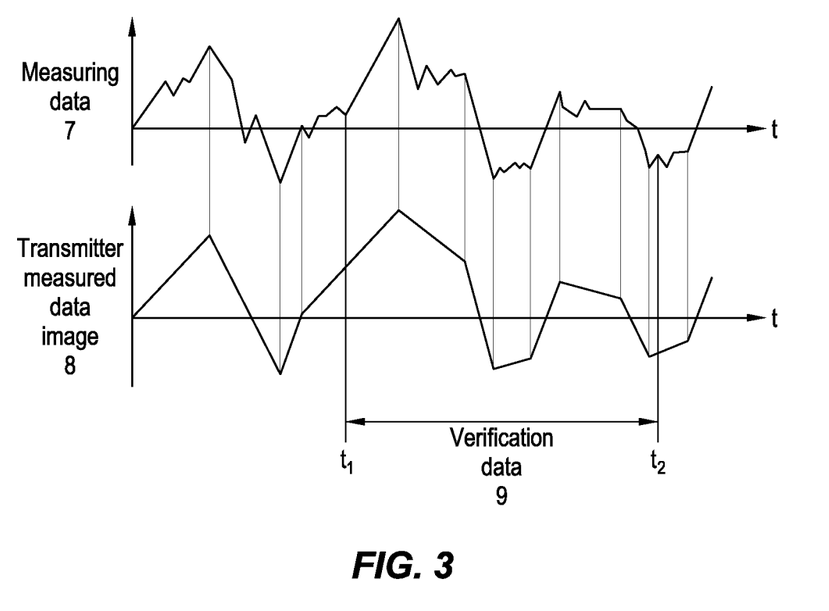
FIG. 3 shows a diagrammatic comparison of a measuring signal and a measured data image derived therefrom and FIG. 4 shows a diagrammatic comparison of multiple measuring signals.

FIG. 3 illustrates in an exemplary manner the relationship between the measured data 7 recorded by a measuring device 11 and a measured data image 8 created on the basis of the measured data 7. In the case illustrated here, the measured data image 8 has a lower data density than the measured data 7, for example, by applying a lower sampling rate or by applying other lossless or lossy data compression methods. However, the data density is chosen to be sufficiently high, in order to be able to detect in the measured data image 8 as well, certain events which have influenced the profile of the measured data 7. Events may be detected, for example, on the basis of positive and/or negative value peaks and/or slopes of flank areas. An area selected from the measured data image 8 (between an initial time $t_1$ and an end time $t_2$) may be used as verification data 9. The verification data 9 thus correspond to a measured data image 8 in a specific time range.

However, it would also be possible to create the verification data 9 in a different way, for example, the distance between two value peaks each in a certain time range could be used as a data series to create the verification data 9. In this case, the verification data 9 also correspond to the measured data image 8. However, the verification data may also be based on other properties of the measured data image 8, such as slope gradients, zeros, etc. In each case, the verification data contain respectively at least a part of the data of the measured data image 8. The verification data 9 may also be encrypted.

The encryption key cited above in connection with the description of FIG. 1 may optionally also be generated on the basis of a data series ascertained from the measured data image 8.

Figure 4:
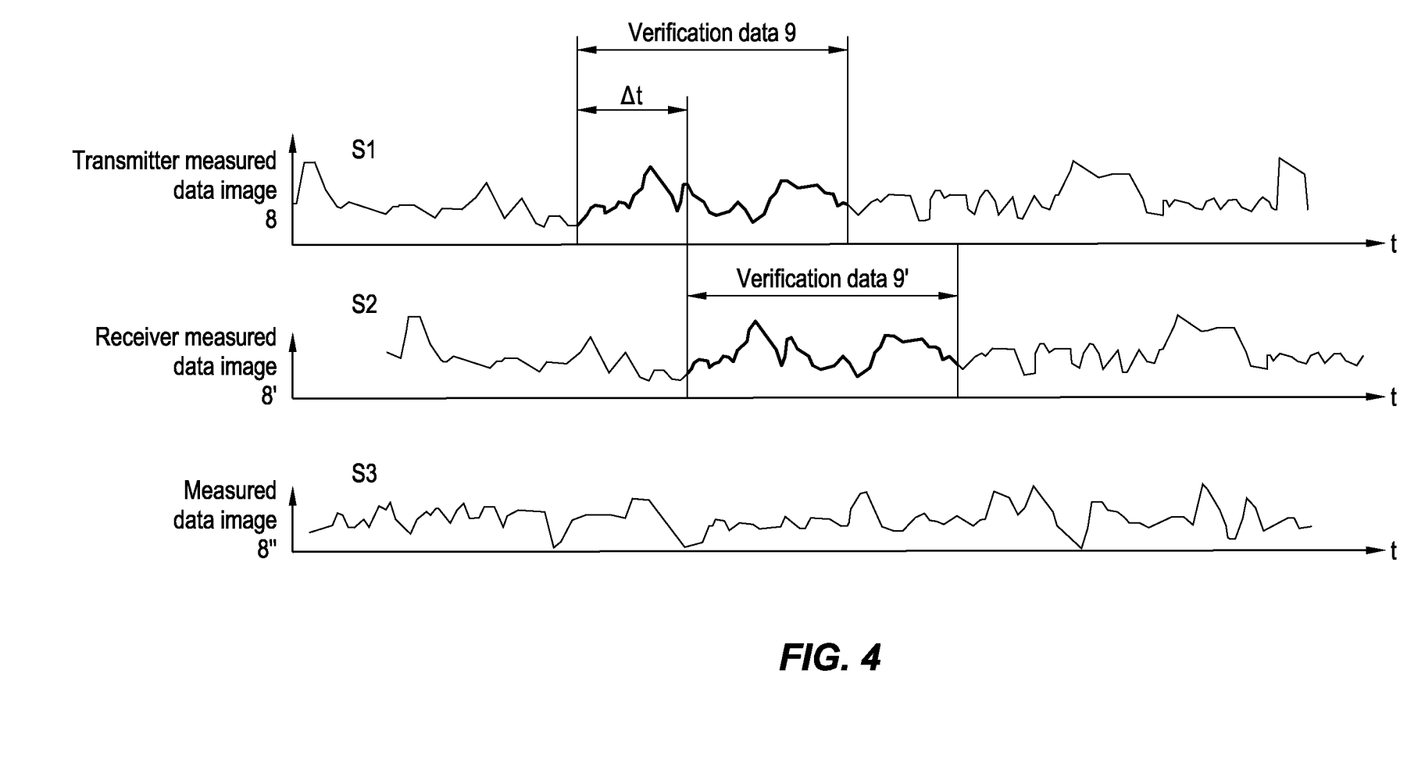

FIG. 4 shows the profile of three measured data images 8, 8' and 8", as these could be created by three measuring devices 11 of a sensor network. The three measuring devices 11 are referred to in FIG. 4 as nodes S1, S2 and S3. The measured data images 8, 8', 8" may either be (as explained in FIG. 3) data profiles with a reduced data rate created on the basis of the respective measured data 7, or they may correspond to the measured data 7.

In the example shown, the nodes S1 and S2 measure on the same process, i.e., their two observations correlate. The profile of the measured data 7 of S1 and S2 therefore matches, S2 being time delayed with respect to S1 by an offset $\Delta t$. However, there could also be any other detectable correlation between the two measured data profiles, for example only a "slight" correlation which results, for example, when vibrations are measured at different locations in an engine.

The node S3 measures on another process, hence, there is no correlation to S1 and S2.

If node S1 then seeks to establish communication with node S2 (for example, by sending a message M as described above), it can prove its legitimacy by adding a section of the measured data image 8 to this message M. This section forms the verification data 9 shown in FIG. 4.

On the basis of the correlation between S1 and S2, S2 finds in its own recordings of the measured data image 8' the section 9', which corresponds to the obtained verification data 9. In the representation of FIG. 4, the receiver measured data image 8' is merely time-shifted relative to the receiver measured data image 8, the data profile otherwise matching. However, more complex correlations may also exist, from which S2 may conclude that S1 has measured on the same process and is therefore not only locally close, but also trustworthy.

What follows then, for example, is the establishment of an encrypted, trustworthy communication. The knowledge of part of the history of the process serves as a proof of identity. It may thus replace other mechanisms, for example a certificate, as used in trusted websites (https). This offers the advantage that a complex certificate management (usually requiring a user intervention) is not necessary.

Conversely, node S2 could optionally return data (from another period) to S1 so as to also confirm to S1 that S2 is a legitimate communication partner.

REFERENCE NUMERALS

Network node 1
Transducer 2
Wireless interface 3
Processor unit 4
Data memory 5
Data network 6
Measured data 7
Transmitter measured data image 8
Receiver measured data image 8'
Verification data 9
Communication partner 10
Measuring device 11
Automation system 12
Measurement environment 13
Engine test bench 14
Time signal generator 15
Test object 16
Dynamometer 17

The invention claimed is:

1. A method for establishing a communication connection between a network node and a communication partner in a data network, wherein the method includes the following steps:
    receiving at the network node at least one message via a wireless interface from the communication partner, wherein the at least one message is a verification message, and verification data is attached to the verification message, and includes a transmitter measured data image representative of measured data acquired by the communication partner in a preceding recording period in a certain time range; and
    verifying, via the network node, the communication partner by a comparison, based on a correlation known to the network node and/or communicated by the communication partner to the network node, of the transmitter measured data image with a receiver measured data image created separately from the transmitter measured data image, and which is stored in a data memory of the network node;
    wherein after the verification of the communication partner, the network node creates at least one virtual network node on the basis of the correlation.

2. The method according to claim 1, characterized in that the data network is an ad hoc network.

3. The method according to claim 1, characterized in that the network node and the communication partner are a measuring device or an automation system of a measurement environment independent of one another.

4. The method according to claim 3, characterized in that the network node creates an encryption key for an encrypted communication with the communication partner based on the transmitter measured data image.

5. The method according to claim 1, characterized in that the network node creates an encryption key for an encrypted communication with the communication partner based on the transmitter measured data image.

6. The method according to claim 5, characterized in that the network node further creates the encryption key for the encrypted communication with the communication partner on the basis of the receiver measured data image.

7. The method according to claim 1, characterized in that the network node creates an encryption key for an encrypted communication with the communication partner on the basis of the receiver measured data image.

8. The method according to claim 7, characterized in that after the verification of the communication partner, the network node creates at least one virtual network node on the basis of the correlation.

9. A network node comprising:
at least one transducer,
at least one wireless interface,
at least one processor unit, and
at least one data memory,
wherein program logic executable by the network node is implemented in the network node, characterized in that the executable program logic of the network node is configured and arranged to
receive at the network node at least one message via a wireless interface from a communication partner, wherein the at least one message is a verification message, and verification data is attached to the verification message and includes a transmitter measured data image representative of measured data acquired by the communication partner in a preceding recording period in a certain time range, and
verify, via the network node, the communication partner by a comparison, based on a correlation known to the network node and/or communicated by the communication partner to the network node, of the transmitter measured data image with a receiver measured data image created separately from the transmitter measured data image, and which is stored in the at least one data memory of the network node;
wherein the executable program logic of the network node is further configured and arranged, after the verification of the communication partner, to create at least one virtual network node on the basis of the correlation.

10. The network node according to claim 9, characterized in that the network node is a measuring device configured and arranged for use with a measuring environment.

11. The network node according to claim 9, characterized in that the network node is a measuring device configured and arranged for use with an automation system or an engine test bench.

12. The network node of claim 9, wherein the executable program logic of the network node is further configured and arranged to create an encryption key for an encrypted communication with the communication partner based on the transmitter measured data image.

13. The network node of claim 9, wherein the executable program logic of the network node is further configured and arranged to create an encryption key for an encrypted communication with the communication partner on the basis of the receiver measured data image.

* * * * *